US007167587B2

(12) United States Patent
Ii et al.

(10) Patent No.: US 7,167,587 B2
(45) Date of Patent: Jan. 23, 2007

(54) SEQUENTIAL CLASSIFIER FOR USE IN PATTERN RECOGNITION SYSTEM

(75) Inventors: David L. Ii, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 729 days.

(21) Appl. No.: 10/233,218

(22) Filed: Aug. 30, 2002

(65) Prior Publication Data

US 2004/0042666 A1 Mar. 4, 2004

(51) Int. Cl.
G06K 9/62 (2006.01)
(52) U.S. Cl. ..................................... 382/228
(58) Field of Classification Search ................ 382/228
See application file for complete search history.

(56) References Cited

U.S. PATENT DOCUMENTS

| 3,636,513 A | | 1/1972 | Tisdale |
| 4,028,674 A | | 6/1977 | Chuang |
| 4,066,999 A | | 1/1978 | Spanjersberg |
| 4,589,142 A | * | 5/1986 | Bednar ........................ 382/226 |
| 4,593,367 A | * | 6/1986 | Slack et al. .................... 706/12 |
| 4,599,692 A | | 7/1986 | Tan et al. |
| 4,618,988 A | | 10/1986 | Schiller |
| 4,797,937 A | * | 1/1989 | Tajima ........................ 382/101 |
| 5,054,093 A | | 10/1991 | Cooper et al. |
| 5,060,277 A | | 10/1991 | Bokser |
| 5,075,896 A | | 12/1991 | Wilcox et al. |
| 5,077,807 A | * | 12/1991 | Bokser ........................ 382/160 |
| 5,119,438 A | | 6/1992 | Ueda et al. |
| 5,239,594 A | | 8/1993 | Yoda |
| 5,274,714 A | | 12/1993 | Hutcheson et al. |
| 5,337,371 A | | 8/1994 | Sato et al. |
| 5,345,518 A | | 9/1994 | Murakami |
| 5,347,595 A | | 9/1994 | Bokser |
| 5,418,864 A | | 5/1995 | Murdock et al. |
| 5,444,793 A | | 8/1995 | Kelland |
| 5,479,523 A | | 12/1995 | Gaborski et al. |
| 5,524,065 A | * | 6/1996 | Yagasaki ..................... 382/226 |
| 5,537,488 A | | 7/1996 | Menon et al. |
| 5,544,267 A | | 8/1996 | Mahoney et al. |
| 5,572,604 A | | 11/1996 | Simard |
| 5,703,964 A | | 12/1997 | Menon et al. |
| 5,963,666 A | | 10/1999 | Fujisaki et al. |
| 6,076,083 A | * | 6/2000 | Baker .......................... 706/52 |
| 6,226,409 B1 | * | 5/2001 | Cham et al. ................. 382/228 |
| 2006/0178887 A1 | * | 8/2006 | Webber ....................... 704/256 |

* cited by examiner

Primary Examiner—Andrew W. Johns
Assistant Examiner—Hadi Akhavannik
(74) Attorney, Agent, or Firm—Tarolli, Sundheim, Covell & Tummino LLP

(57) ABSTRACT

The present invention recites a method and computer program product for classifying an input pattern into an associated output class. For each of a plurality of classification rungs, each rung representing at least one output class, the a priori probability that an input pattern will be associated with a class represented by that rung is determined. A sequential order of processing for the plurality of classification rungs is assigned, based upon the a priori probability associated with each classification rung. A confidence value, associated with a represented class, is computed for each classification rung, in the assigned order, until a class is selected or a termination event occurs. The associated confidence values are compared to a predetermined threshold, and a class associated with a confidence value that first exceeds the threshold is selected, if a confidence value exceeds the threshold.

12 Claims, 5 Drawing Sheets

SEQUENTIAL CLASSIFIER FOR USE IN PATTERN RECOGNITION SYSTEM

BACKGROUND OF THE INVENTION

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console.

A typical prior art classifier receives an input pattern, associated with one of a plurality of classes and analyzes its relationship to each class via a mathematical classification technique. From this analysis, the system produces an output class and an associated confidence value. Although classification techniques vary, certain features are typical among them. In the course of analysis, the inputs are compared to known training data for each class. An associated confidence value is generated for each class, reflecting the likelihood of the class being the associated class. The class with the highest confidence value is selected, and the selected class and the associated confidence value are outputted.

The selection of the classifier technique is influenced by many factors. Among the more important of these is the "dimensionality" of the system. Dimensionality relates to both the number of possible classes into which a pattern may be classified and the number of features used to classify the input. The dimensionality of a system is directly tied to the application for which it is designed. In an English text recognition system, it is necessary to have a class for both forms of each letter as well as classes for each number. Thus the system will have around seventy classes. In an image recognition system used for identifying images such as stamps or labels, hundreds of classes may be necessary. Typically, increased numbers of features are necessary to deal with large output sets. As a result, the classification process for any system with high dimensionality is computationally intensive.

When dealing with a large number of output classes, it is typical for a number of these classes to be fairly common and a similar amount to be fairly rare, relative to the other classes. A system capable of acquiring and utilizing these relative probabilities could eliminate much of the unnecessary processing associated with these rare classes. Such a system could perform high dimensionality classifications considerably more quickly than a comparable prior art classifier.

SUMMARY OF THE INVENTION

In accordance with one aspect of the present invention, a method is disclosed for classifying an input pattern into an associated output class. For each of a plurality of classification rungs, each rung representing at least one output class, the a priori probability that an input pattern will be associated with a class represented by that rung is determined. A sequential order of processing for the plurality of classification rungs is assigned based upon the a priori probability associated with each classification rung. A confidence value, associated with a represented class, is computed for each classification rung, in the assigned order, until a class is selected or a termination event occurs. The associated confidence values are compared to a predetermined threshold, and a class associated with a confidence value that first exceeds the threshold is selected, if a confidence value exceeds the threshold.

In accordance with another aspect of the present invention, a computer program product, operative in a data processing system, is disclosed for classifying an input pattern into an associated output class. Within the program, a sequencing stage determines, for each of a plurality of classification rungs, each representing at least one output class, the a priori probability that an input pattern will be associated with a class represented by that rung. The stage also assigns a sequential order of processing for the plurality of classification rungs based upon the a priori probability associated with each classification rung.

A classification stage then computes a confidence value for each classification rung, in the assigned order, until a class is selected or a termination event occurs. A rejection stage compares these associated confidence values to a predetermined threshold and selects a class associated with a confidence value that first exceeds the threshold, if a confidence value exceeds the threshold.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with the present invention, a method for classifying an input pattern via sequential complex pattern classification technique is described. The classification method may be applied to any pattern recognition task, including, for example, OCR (optical character recognition), speech translation, and image analysis in medical, military, and industrial applications.

Figure 1:
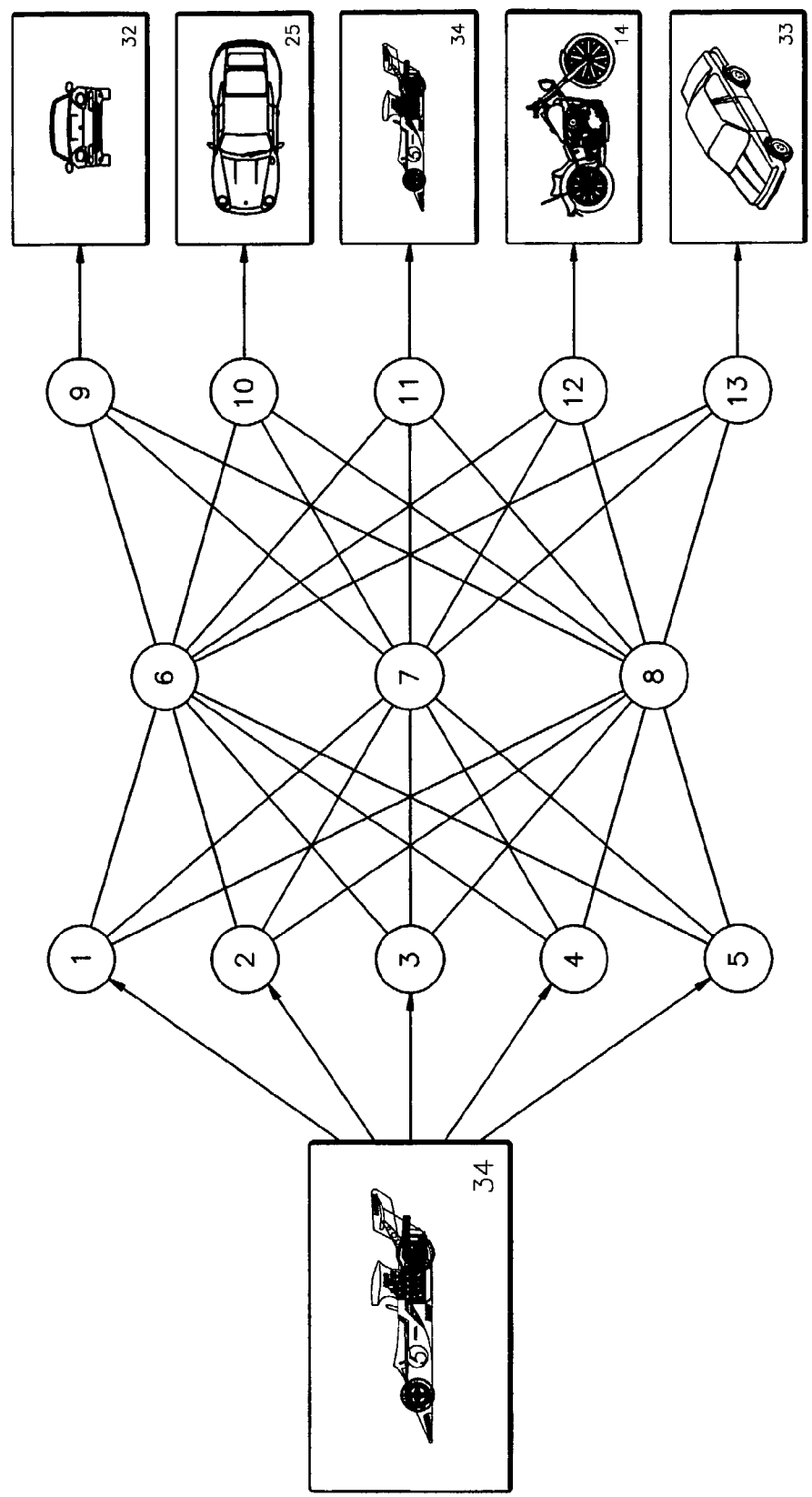
FIG. 1 is an illustration of an exemplary neural network utilized for pattern recognition.

FIG. 1 illustrates a neural network which might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. Also, additional hidden layers may be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receive input signals with values relating to features of an input pattern. By way of example, the signal values could relate to the portion of an image within a particular range of grayscale brightness. Alternatively, the signal values could relate to the average frequency of a audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node may receive a signal of different value from each input node. For example, assume that the input signal at node 1 has a value of 5 and the weight of the connection between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into an transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9–13, but like the input values described above, the output signal value may be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In a typical system, the class with the highest associated probability is selected, so long as the probability exceeds a predetermined threshold value. The value represented by the output signal is retained as a confidence value of the classification.

Figure 2:
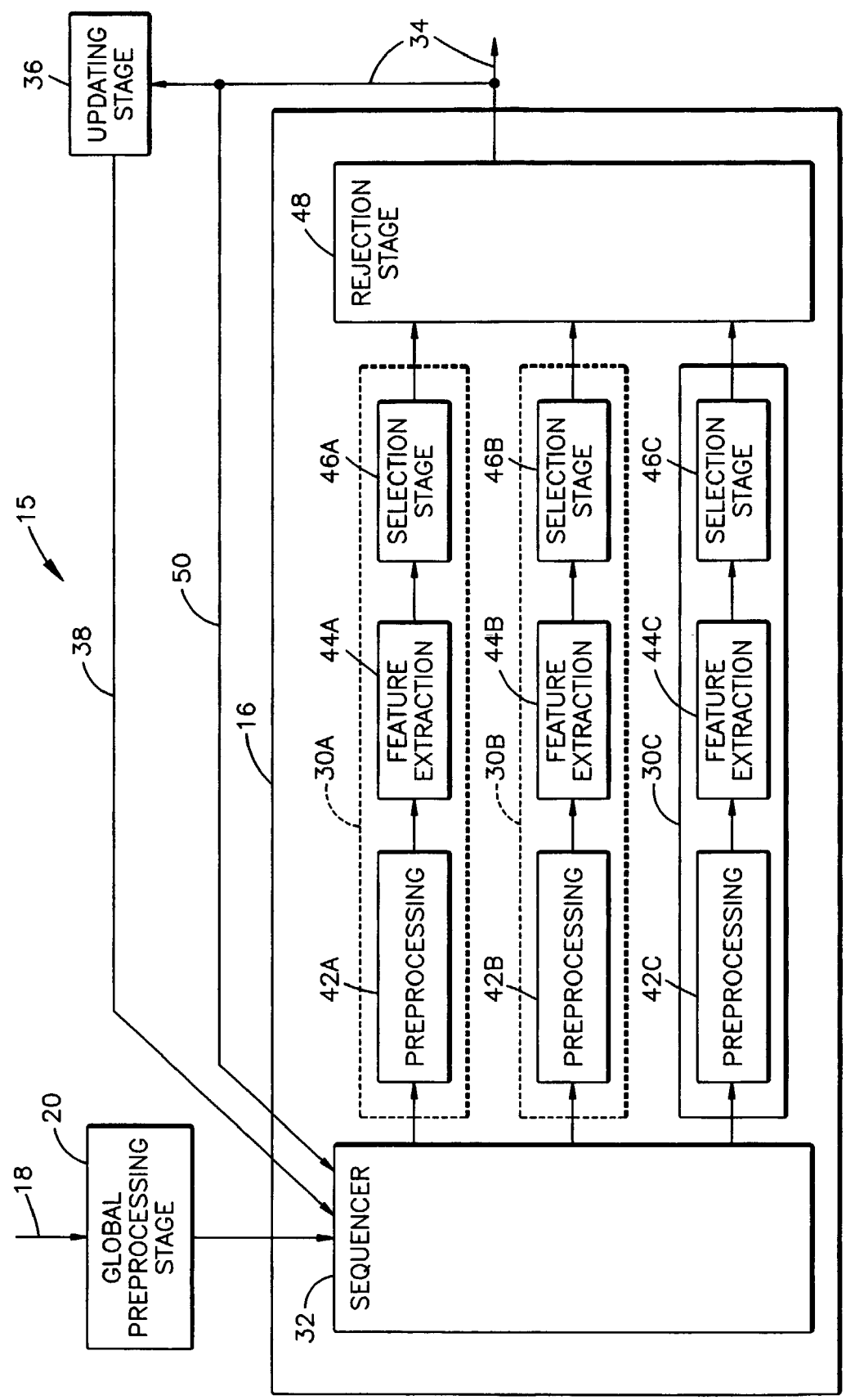
FIG. 2 is a schematic diagram of the present invention in the context of a pattern recognition system.

FIG. 2 illustrates a pattern recognition system 15 incorporating a sequential complex classifier 16. A pattern 18 input into the pattern recognition system 15 enters a global preprocessing stage 20, where various representations of the image pattern are produced for further processing. By way of example, image data might be normalized and binarized for later analysis. Audio data might be filtered to reduce noise levels. The pattern data is then passed to the complex classifier 16.

It should be noted that the complex classifier 16 will typically be implemented as a computer program, preferably a program simulating, at least in part, the functioning of a neural network. Specifically, data analysis within the classification tasks performed by the system will generally take place within a simulated neural network system. Any specific equations or formulas presented hereinafter are intended only as a mathematical description of the weighting and processing within this simulation. Accordingly, the structures described herein may be considered to refer to individual modules and tasks within that program.

The complex classifier 16 contains a plurality of classification rungs 30A–30C, each representing at least one output class. For the purpose of example, a complex classifier 16 with three classification rungs is shown. Each classification rung 30A–30C selects one of the classes it represents. The rung (e.g. 30A) then calculates a probability that the selected input pattern is associated with the selected class. Each classification rung 30A–30C produces a probability value for the selected class by a common method.

Only one of the classification rungs 30A–30C is active at any particular time. The order of processing of the classification rungs 30A–30C is determined by a sequencer 32. The sequencer 32 determines for each classification rung an a priori probability that a random input pattern would be associated with a class represented by that rung. This can be done in a number of ways, including the selection of training data reflecting real world populations of classes or the creation of a fixed order reflecting prior knowledge about the specific application. In the illustrated example, the a priori probabilities are initialized during training and updated by recording the output 34 of the complex classifier 16 as part of an updating stage 36. The updating stage 36 maintains for each classification rung 30A–30C the total of the number of input patterns that have been associated with a class represented by the rung. The updating stage 36 can be conceived as a histogram, tallying the number of accepted outputs 34 for each classification rung 30A–30C. The results 38 of the updating stage are used to update the a priori determination of the sequencer 32.

Focusing on the individual classification rungs, each rung 30A–30C contains a preprocessing stage 42A–42C. The preprocessing stage (e.g. 42A) modifies the incoming pattern data to facilitate later feature extraction. This modification can take a number of forms, depending upon the types of feature data which will later be extracted from the pattern.

A feature extraction stage 44A–44C at each classification rung 30A–30C analyzes preselected features of the processed pattern. The selected features can be literally any values derived from the pattern that vary sufficiently among the various output classes to serve as a basis for discriminating among them. For ease of reference, these selected values will be referred to hereinafter as feature variables. Data extracted from the features can be conceived for computational purposes as a feature vector, with each element representing the value of a feature variable.

The extracted feature vector is then inputted into a class selection stage 46A–46C. At the class selection stage (e.g. 46A), the classification rung (e.g. 30A) selects one of its represented output and generates a confidence value, reflecting the a posteriori probability that the inputted feature vector is associated with the selected class. This selection may take place via any number of means, such as a classification technique, a predetermined ranking of class probabilities, or even random selection. The classification technique used to calculate these confidence values must be capable of producing meaningful confidence values and must be common to all classifiers.

The confidence value is passed to a rejection stage 48. During the rejection stage 48, the confidence value is compared to a threshold value. If the confidence value exceeds the threshold, the classification is accepted. An output signal 34 is sent to the updating stage 36 to update the a priori probabilities and a termination signal 50 is sent to the sequencer 32 to stop the recognition process. If the confidence value from a particular class does not exceed the threshold, the class is rejected. No updates are made, and the sequencer 32, will proceed to activate the remaining classification rung with the highest associated a priori probability. This process will continue until either a class is selected, or a termination event occurs. A number of termination events can be selected for the classifier, including the passage of a period of time, the processing of a set number of classification rungs 30A–30C, or any similar event.

It is necessary for each of the classifiers to be trained prior to operation of the system. In a training mode, internal class parameters are computed from a "training set" of feature vectors. To compute the training data, numerous representative pattern samples are needed of each output class. The pattern samples are converted to vector samples via a preprocessing and feature extraction process similar to that described above. The training data for each classifier typically includes statistics extracted from these sample vectors.

Figure 3:
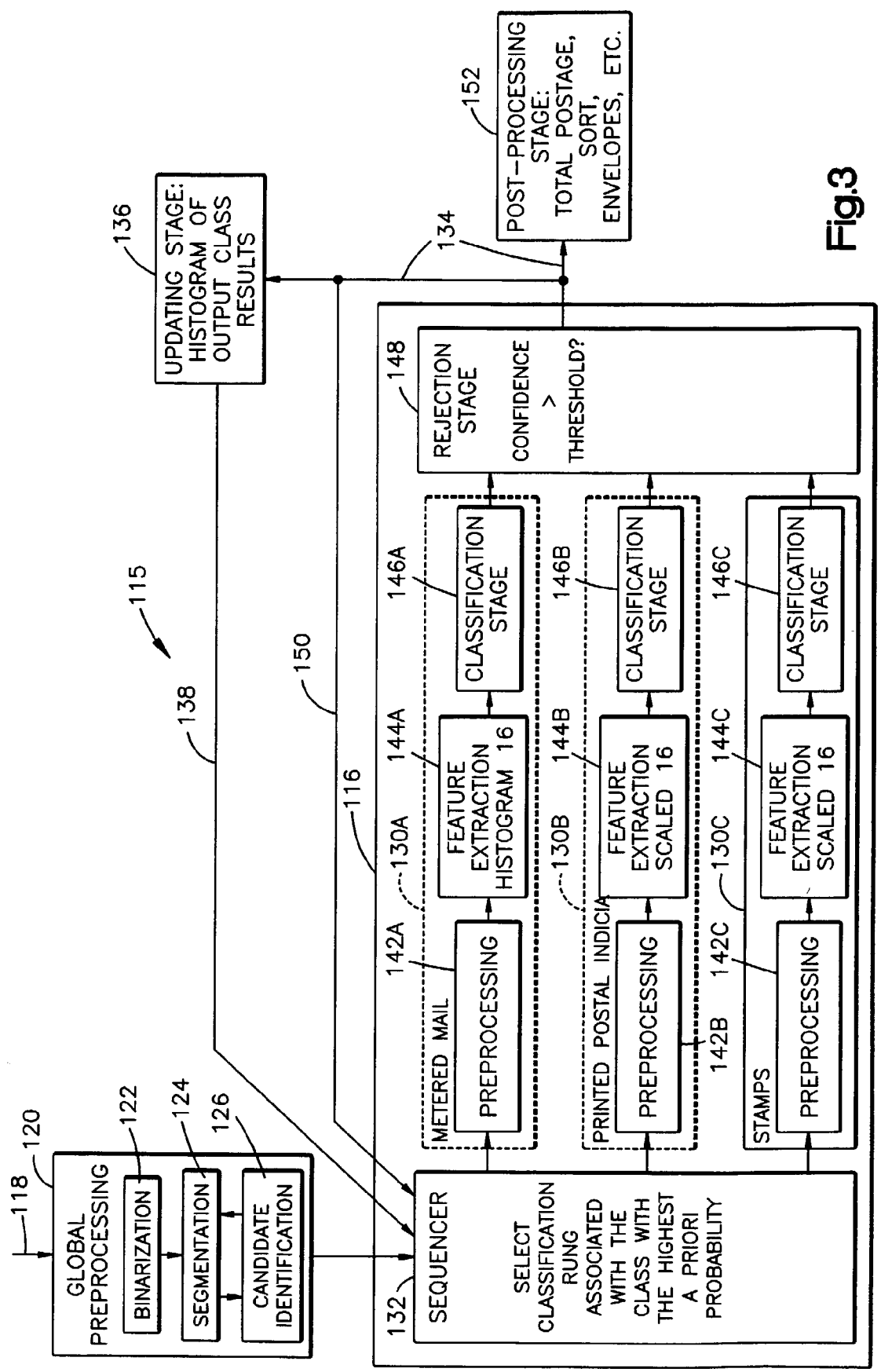
FIG. 3 is a schematic diagram of a postal indicia recognition system incorporating the present invention.

An application of this process in the context of a mail sorting system is shown in FIG. 3. A mail sorting system 115 containing a complex classifier 116 is capable of scanning an envelope, locating any postal indicia thereon, and classifying the postal indicia. The claimed process is used to determine the types of postal indicia present on the envelope. The system could check the mail for adequate postage or keep a running total of the postage value of a set of mail. As an alternate embodiment, the text characters on the envelope can be located, parameterized, and classified by a system in accordance with the present invention. Once the zip code or city of destination has been determined, the system could sort the mail based on destination.

Focusing on the illustrated system, a digital scanned image 118 of the envelope is produced, consisting of a number of discrete pixels. The scanned image 118 is input to a global preprocessing stage 120, which filters and normalizes the image. Within the global preprocessing stage 120, a binarization routine 122 creates a binarized translation of the data by comparing the grayscale value of each pixel within the digital image to a threshold value and assigning a binary result based on the comparison.

The binarized image is then passed from the binarization routine 122 to the image segmentation routine 124. The image segmentation routine 124 divides the image into segments and submits them to the candidate identification routine 126. The candidate identification routine 126 identifies segments containing potential objects of interest. Such candidate image segments are retained for classification. Segments which clearly do not contain postal indicia are rejected.

After preprocessing, a candidate image segment is inputted into the complex classifier 116. The complex classifier contains a plurality of classification rungs 130A–130C. In the illustrated postal indicia recognition system 120, a large number of classification rungs may be necessary to represent the full range of output classes. For the purposes of example, however, only three classification rungs 130A–130C are shown in FIG. 3. Two of the classification rungs (e.g. 130A–130B) are shown in dotted lines, to emphasize the fact that only one classification rung (e.g. 130C) will be actively processing data at any particular time.

Inside the complex classifier 116, the processed image is routed to one of the classification rungs 130A–130C by a sequencer 132. The sequencer 132 receives data on the frequency of the output 134 of each class from the updating stage 136 in the form of histogram data 138. The sequencer 132 uses the histogram data to determine for each of the classification rungs 130A–130C, the a priori probability of a represented class of postal indicia entering the system. Specifically, the sequencer 132 determines the classification rung (e.g. 130A) that had its represented classes outputted with the greatest frequency during the run-time operation of the complex classifier 116. In a preferred embodiment, histogram data are initialized during training to approximate the real-world frequency of the various classes of postal indicia, and are updated each time the system successfully classifies an input image segment.

The histogram values in the updating stage 136 may be accumulated over the life of the complex classifier 116, but in most applications, it is preferable that histogram values be eliminated under certain conditions. In the example embodiment, a recursive algorithm with a forgetting factor may be used to update each of the values. In such a system, the original estimate based upon N samples has an associated forgetting factor of 1/N. When the original estimate is updated with a new sample, a second estimate is created based on the new sample. These estimates are summed with the new estimate weighted by a factor of 1/N, and the original estimate receiving a weight of (1−1/N).

In other systems, the updating stage 136 might only store a set number of values in a rotating queue, eliminating older values when new values are received. Rotating the data in this manner allows old indicia that may have left circulation to be phased out as new indicia are introduced. Alternatively, the data points in the updating stage 136 may be removed after a predetermined period of time, after a set number of classifications without identifying a pattern belonging to the class associated with the data point, or upon the occurrence of a similar specified condition.

The sequencer 132 uses the data concerning the a priori probabilities to determine the order in which the individual classification rungs 130A–130C will process the input image data. The sequencer 132 ranks the individual classification rungs 130A–130C by their associated a priori probabilities, such that the rung with the highest associated a priori probability is processed first and the rung with the lowest a priori probability is processed last. The sequencer 132 then inputs the image data into the highest ranked classification rung to begin processing.

Processing within the classification rung (e.g. 130A) begins with a preprocessing stage (e.g. 142A). The preprocessing stage (e.g. 142A) modifies the incoming image data to facilitate later feature extraction. The specific modifications performed on the data depend upon the types of feature data which will later be extracted from the image. For example, if extraction of the selected feature type requires an unacceptable amount of processing for large images, the image may be downscaled during preprocessing. Other examples will be apparent to one skilled in the art.

The image progresses to the feature extraction stage (e.g. 144A), which generates data from selected features within the image. The selected features can be literally any features discernible from the scan of the image that vary sufficiently among the various classes of images to serve as a basis for discriminating among them. These features will be selected prior to any training or application of the classification system.

In the disclosed embodiment, two different sets of feature data may be used either alone or in combination, a set of sixteen histogram feature variables and a set of sixteen "Scaled 16" feature variables. The feature variables are chosen in accordance with the types of output classes represented by the classification rung (e.g. 130A). The histogram portion of the feature vector focuses on the grayscale value of the individual pixels within the image. Each of the sixteen histogram variables represents a range of grayscale values. The values for the histogram feature variables are derived from a count of the number of pixels within the image with a grayscale value within each range. By way of example, the first histogram feature variable might represent the number of pixels falling within the lightest sixteenth of the grayscale range. Accordingly, the histogram feature set is most useful when the represented output classes include picture data. In the context of the present example, a classification rung (e.g. 130A) representing stamp output classes would likely use the histogram feature variable set.

The "Scaled 16" variables represent the average grayscale values of the pixels within sixteen preselected areas of the image. By way of example, the sixteen areas may be defined by a 4×4 equally spaced grid superimposed across the image. Thus, the first variable may represent the average or summed value of the pixels within the upper left region of the grid. The "Scaled 16" feature set is most useful in identifying simple indicia that are not represented well by the histogram set. A classification rung (e.g. 130B & 130C) representing printed postal indicia classes or metered mail classes would likely make use of the "Scaled 16" feature variable set. The variance in the features among the sets does not affect the validity of the calculated confidence value. So long as the classification technique used to determine the confidence value is the same, the results will not be greatly affected by the use of different feature sets.

Continuing with the illustrated example, the extracted feature vector is inputted to a classification stage (e.g. 146A). The classification stage (e.g. 146A) compares the feature vector to known parameters for the class to determine the likelihood that the class is associated with the input vector. The classification stage is required to compute a meaningful confidence value for the one or more classes it determines. Many classification techniques accurately select an output class, but sacrifice the validity of the confidence output for the sake of computation time. Such techniques are not useful within the present invention because of the poor performance of their confidence outputs. Accordingly, careful selection of the classification technique is necessary. Radial basis function techniques and probabilistic neural networks are often selected for applications requiring strong confidence outputs.

In the illustrated example, a confidence value is obtained for each class via the following formula:

$$\text{Confidence} = 1 - \frac{\sum_{j=1}^{m}\left(\frac{|x_j - u_{ij}|}{\sigma_{ij}}\right)}{D_{i(max)}} \quad \text{where,}$$

Equation (1)

$$\frac{|x_i - \mu_{ij}|}{\sigma_{ij}}$$

is clipped at $D_{max}$ i=the class selected by the sequencer
m=the number of feature variables
j=a feature vector index number
$x_j$=the $j^{th}$ element of input feature vector x
$u_{ij}$=the mean of the $j^{th}$ feature variable across the sample feature vectors in class i
$\sigma_{ij}$=the standard deviation of the $j^{th}$ feature variable across the sample feature vectors in class i
$D_{i(max)}$=The product of m and $D_{max}$ The use of clipping and a maximum value for the term [|x−μ|/σ] is necessary to bound the confidence computation in a manner suitable to conversion to a probability. This is accomplished by limiting the maximum value of each term (i.e. $|x_i - \mu_{ij}|/\sigma_{ij}$ for each i) to an experimentally determined clipping value, $D_{max}$. In the current embodiment, $D_{max}$ has been experimentally tuned to a value of 7 (in units of the confidence function).

The confidence value is passed to a rejection stage 148, where it is compared to a threshold. Where the confidence value does not exceed the threshold, the classification is rejected. In this case, the selected classification rung is ignored and the sequencer selects the classification rung next in the predetermined sequence (i.e. the remaining classification rung with the highest a priori probability). This process may continue until a classification is accepted by the rejection stage 148. In a preferred embodiment, however, the classification process is limited to a predetermined time period, and the complex classifier 116 may not initiate each of the classification rungs 130A–130C. Envelopes that are not classified within the predetermined time may be ejected from the system 120 to be processed manually.

Where the confidence value exceeds the threshold, a termination signal 150 is sent to prevent the sequencer 132 from initiating another classification rung (e.g. 130B). Additionally, the output 134 of the selected class is sent to the updating stage 136 to update the a priori probabilities. The updating stage 136 adds the class selection result to its histogram of values and sends the amended histogram data 138 to the sequencer 132. The sequencer 132 makes a corresponding change in the a priori probabilities and rankings of the various classification rungs 130A–130C.

The classification result 134 is also inputted to a post-processing stage 152. The post-processing stage 152 controls the application of the information gained in the classification stage 120 to a real world problem. In the example embodiment, the data is used simply to maintain a total of the incoming postage. Other tasks for the post-processing stage should be apparent to one skilled in the art.

Figure 4:
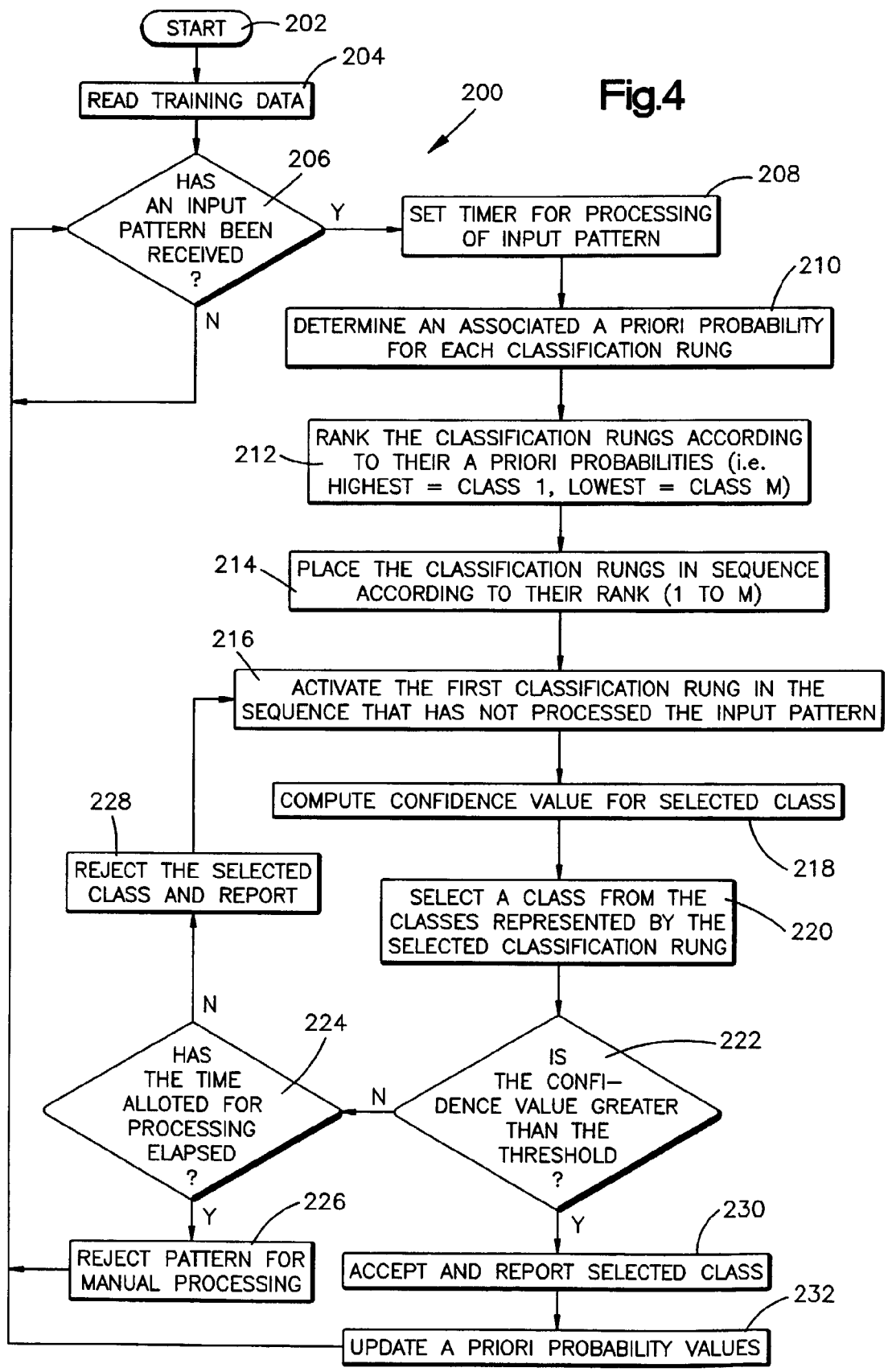
FIG. 4 is a flow diagram illustrating the run-time operation of the complex classifier.

The run-time operation 200 of the complex classifier 16 in the example embodiment is illustrated in FIG. 4. The program commences at step 202 and proceeds to step 204. In step 204, the process reads the stored training data for each class. The program then proceeds to step 206, where it waits for the input of an input pattern 18. Upon receipt of an input pattern 18, the program proceeds to step 208, where a timer is set to govern the processing time used for the input pattern. The system will process the input pattern for a set amount of time.

In step 210, the program determines for each classification rung an a priori probability that a random input pattern would be associated with a class represented by that rung. The program then advances to step 212, where it ranks the classification rungs in the order of decreasing a priori probability. Accordingly, the classification rung with the highest associated a priori probability receives a rank of 1, and the classification rung with lowest a priori possibility receives a rank of M, where M is the number of classification rungs. The program then proceeds to step 214. In step 214, the program places the classification rungs in sequence, according to their ranked a priori probabilities. The program then advances to step 216.

In step 216, the program activates the first classification rung in the sequence which has not yet processed the input pattern. In essence, the program activates the highest ranked classification rung that has not been rejected. The program then proceeds to step 218, where the program selects a class from the classes represented by the activated rung. This selection can be accomplished in a number of ways, but in a preferred embodiment, the class most likely to be associated with the input pattern is chosen via a classification technique. The process then advances to step 220, where the computes a confidence value for its represented class best resembling the input pattern, reflecting the a posteriori probability that the selected class is the class associated with the input pattern. The program then advances to step 222.

In step 222, the program determines whether the computed confidence value from step 220 exceeds a predetermined threshold value. If the confidence threshold in step 222 is not exceeded, the program proceeds to step 224, where the processing timer is checked. If the time for the classification has elapsed, the program advances to step 226, where the input pattern is rejected for manual processing. The program then returns to step 206 to await another input pattern.

If the time for classification has not elapsed, the process advances to step 228, where the program rejects the selected class and reports the rejection. The program then returns to step 216 to select the next classification rung in the sequence. Returning to the decision at step 222, if the threshold is exceeded, the program advances to step 230, where the classification is accepted and reported. The program then advances to step 232, where the a priori probability values are updated to reflect the new output. The program then returns to step 206 to await the input of another pattern.

Figure 5:
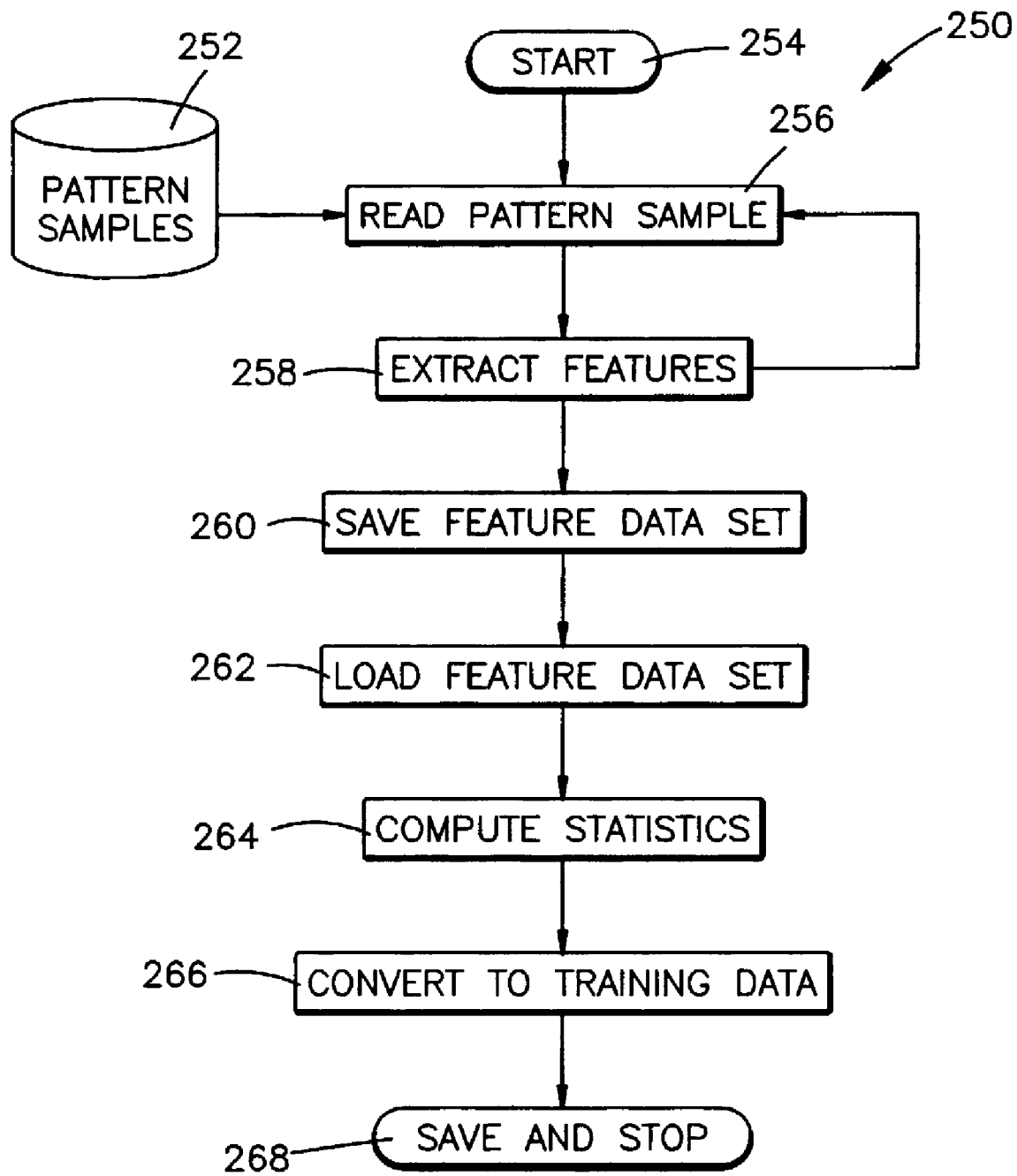
FIG. 5 is a flow diagram illustrating the training of the individual classifiers within the complex classifier.

FIG. 5 shows a flow-chart illustrating the operation of a computer program 250 used to train a classification rung via computer software. Prior to training, the trainer gathers a sufficient number of pattern samples 252 belonging to the represented classes. The necessary number of training samples is variable. The number of output classes, selected features, and classifier types directly affect the number of samples needed for good results. Depending on the application, too many samples can be problematic, as it can take too long to process the training data without a significant gain in performance.

The actual training process begins at step 254 and proceeds to step 256. At step 256, the program retrieves a pattern sample from memory. The process then proceeds to step 258, where the pattern samples are converted into feature data inputs that the classification stage (e.g. 46A) would see in normal run-time operation. After the sample feature data from each image are extracted, the results are stored, and the process returns to step 256. After all of the samples are analyzed, the process proceeds to step 260, where the feature data are saved.

The computation of the training data begins in step 262, where the saved feature data are loaded into memory. After retrieving the feature data, the process progresses to step 264. At step 264, the program calculates statistics, such as the mean and standard deviation of the feature variables for each class. Intervariable statistics may also be calculated, including the covariance matrix of the sample set for each class. The process then advances to step 266 where it uses the feature data to compute the training parameters. After these calculations are performed, the process proceeds to step 268 where the training parameters are stored in memory and the training process ends.

This process produces the internal parameters needed by the classification rungs. Usually training would occur prior operation of the classifier. However, in systems such as the postal indicia recognition system described above, where classes may change frequently, the device will need to be retrained periodically. In applications such as text-character recognition, the classes are permanently fixed and retraining is not necessary.

It will be understood that the above description of the present invention is susceptible to various modifications, changes and adaptations, and the same are intended to be comprehended within the meaning and range of equivalents of the appended claims. In particular, it is expected that the classification techniques used in the individual classifiers may be varied without deviating from the intentions and principles of this invention.

Having described the invention, the following is claimed:

1. A method of classifying an input pattern into an associated output class, comprising:

determining, for each of a plurality of classification rungs, each representing at least one output class, the a priori probability that an input pattern will be associated with a class represented by that rung, wherein the a priori probability that the input pattern will be associated with the represented at least one output class is determined independently of any characteristics associated with the input pattern;

assigning a sequential order of processing for the plurality of classification rungs based upon the a priori probability associated with each classification rung;

computing a confidence value associated with a represented class for each classification rung, in the assigned order, until a class is selected or a termination event occurs;

comparing the associated confidence values to a predetermined threshold;

selecting a class associated with a confidence value that first exceeds the threshold, if a confidence value exceeds the threshold;

updating the a priori probabilities associated with each classification rung to reflect the selection of the selected class when the selected class is one of its represented classes; and changing the assigned sequential order of processing for the plurality of classification rungs based upon the updated a priori probabilities.

2. A method as set forth in claim 1 wherein the termination event is the passage of a predetermined period of time.

3. A method as set forth in claim 1, wherein the termination event is the computation of a confidence value by a predetermined number of classification rungs.

4. A method as set forth in claim 1, wherein the input pattern is a scanned image.

5. A method as set forth in claim 4, wherein each of the plurality of output classes represents a variety of postal indicia.

6. A method as set forth in claim 4, wherein each of the plurality of output classes represents an alphanumeric character.

7. A computer program product, implemented on a computer readable medium and operative in a data processing system for use in classifying an input pattern into an associated output class, the computer program product comprising:

a sequencing stage that determines, for each of a plurality of classification rungs, each representing at least one output class, the a priori probability that an input pattern will be associated with a class represented by that rung, wherein the a priori probability that the input pattern will be associated with the determined at least one represented class is determined independently of any characteristics associated with the input pattern, and assigns a sequential order of processing for the plurality of classification rungs based upon the a priori probability associated with each classification rung;

a classification stage that computes a confidence value associated with a represented class for each classification rung, in the assigned order, until a class is selected or a termination event occurs;

a rejection stage that compares the associated confidence values to a predetermined threshold and selects a class associated with a confidence value that first exceeds the threshold, if a confidence value exceeds the threshold; and an updating stage that updates the a priori probabilities associated with each classification rung to reflect the selection of the selected class when the selected class is one of its represented classes and changes the assigned sequential order of processing for the plurality of classification rungs based upon the updated a priori probabilities.

8. A computer program product as set forth in claim 7 wherein the termination event is the passage of a predetermined period of time.

9. A computer program product as set forth in claim 7, wherein the termination event is the computation of a confidence value by a predetermined number of classification rungs.

10. A computer program product as set forth in claim 7, wherein the input pattern is a scanned image.

11. A computer program product as set forth in claim 10, wherein each of the plurality of output classes represents a variety of postal indicia.

12. A computer program product as set forth in claim 10, wherein each of the plurality of output classes represents an alphanumeric character.

* * * * *